United States Patent [19]
Mayerle et al.

[11] Patent Number: 6,158,630
[45] Date of Patent: Dec. 12, 2000

[54] SEGMENTED METER ROLLER ASSEMBLY

[75] Inventors: Dean J. Mayerle; Russell J. Memory, both of Saskatoon, Canada

[73] Assignee: Flexi-Coil Ltd., Saskatoon, Canada

[21] Appl. No.: 09/315,726

[22] Filed: May 21, 1999

[30] Foreign Application Priority Data

| May 22, 1998 | [CA] | Canada | 2238247 |
| May 19, 1999 | [CA] | Canada | 2272504 |

[51] Int. Cl.[7] .................................................. G01F 11/20
[52] U.S. Cl. .................................. 222/413; 222/608
[58] Field of Search .................................. 222/413, 608, 222/626, 630, 637

[56] References Cited

U.S. PATENT DOCUMENTS

| 3,913,503 | 10/1975 | Becker | 222/413 |
| 4,742,938 | 5/1988 | Niewold | 222/413 |

FOREIGN PATENT DOCUMENTS

| 1149235 | 7/1983 | Canada . |
| 1289013 | 9/1991 | Canada . |
| 2242115 | 2/1999 | Canada . |

OTHER PUBLICATIONS

Orbit–Air, Gandy Company Manufacturers, 4 pages.
Morris Industries Parts Manual for "Seed Cup Assembly", p. 25, dated Dec. 1977.
Gason Pty. Operator's Manual, pp. 52–53 with drawing, Dated Feb, 1996.
Simplicity Australia Pty. Operator's Manual, p. 46, undated.
Morris Industries Product Buyer's Guide, p. 20, undated (believed to be circa 1986).
Great Plains Product Catalog, pp. 6, 14, 15, 31, and 53, Dated Oct., 1994.
Great Plains Meter Roller Photograph Taken Feb. 1998.

*Primary Examiner*—Philippe Derakshani
*Attorney, Agent, or Firm*—Larry W. Miller; J. William Stader

[57] ABSTRACT

A new and useful meter roller assembly is provided for an agricultural implement for metering material delivery between a meter box and a series of material runs leading to a series of material distributors, the assembly comprising a shaft for mounting for rotation in the box; a series of roller sections for mounting on the shaft, extending across the runs, the roller sections chosen from the group consisting of blank sections or metering sections; and wherein the series of roller sections includes at least one metering sections corresponding to one the run, for securing to the shaft for rotation therewith and comprising at least one fluted segment and at least one blank segment.

39 Claims, 4 Drawing Sheets

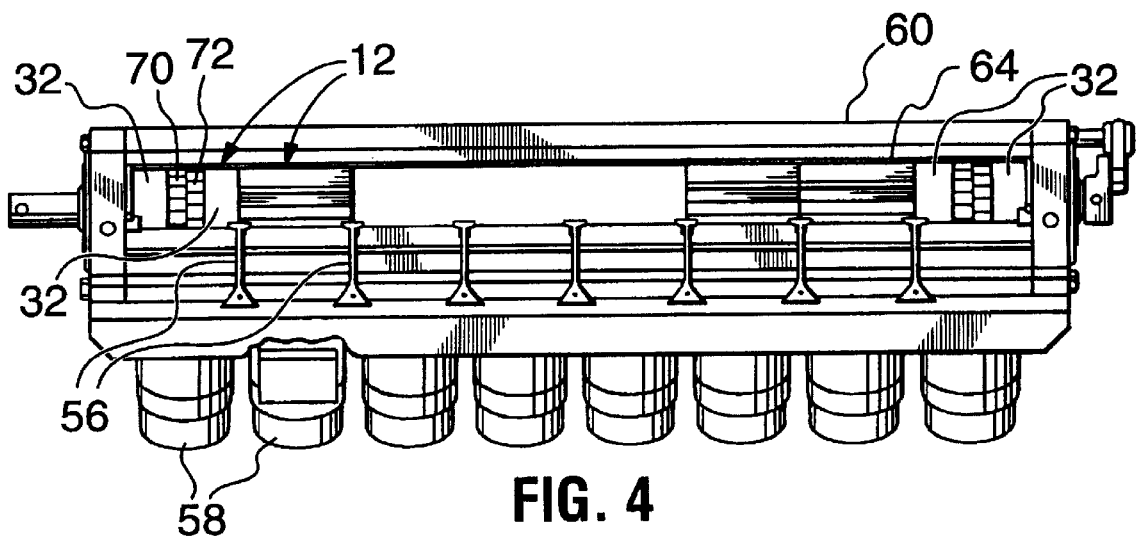
FIG. 4
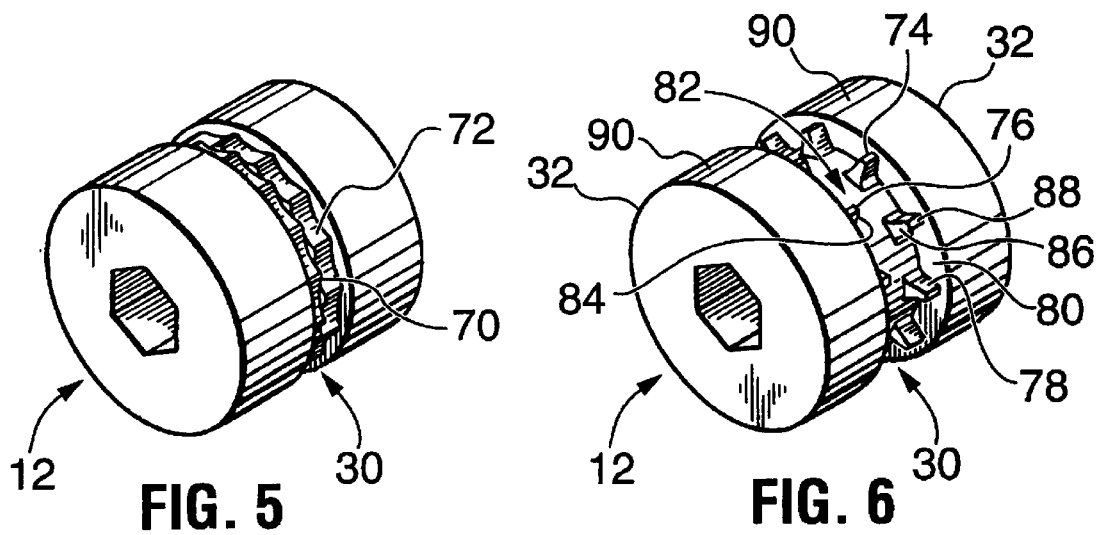
FIG. 5
FIG. 6
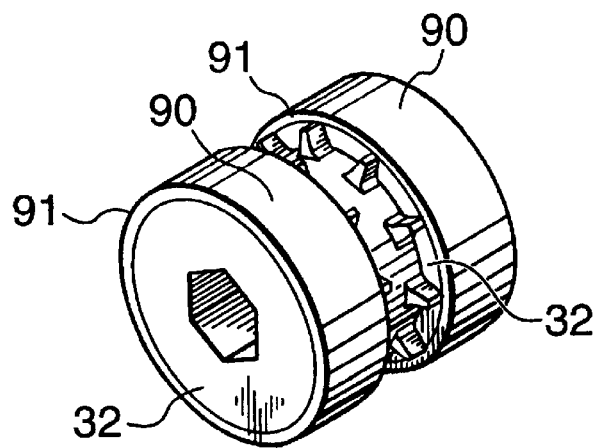
FIG. 7

SEGMENTED METER ROLLER ASSEMBLY

BACKGROUND OF THE INVENTION

This application relates generally to air seeders used for planting agricultural crops and, more particularly, to the meter roller assemblies used in air seeders to meter the flow of seed and/or fertilizer into the flow or air and, more specifically, to segmented metering sections for use in such assemblies.

In modern large scale agricultural operations, seed and/or fertilizer are typically applied to the soil through a series of seed tubes which are associated with soil working tools across the width of a soil working machine. Typically a group of such tubes is fed seed or fertilizer by a distribution header. The distribution header is in turn fed from a tank which may be configured as a separate cart for towing in advance of or trailing the soil working implement.

A metering system is associated with the tank for distribution of product from the tank to the distribution headers of the seed tubes. The metering system normally includes a meter roller situated below the tank in a meter box assembly secured to the tank. Typically the meter box will have a series of outlets known as runs, each of which leads through intermediate tubing to one of the distribution headers. The total number of possible runs typically extends the length of the meter roller. Depending on the number of distribution headers on the soil working implement, the roller assembly will consist of fluted metering sections corresponding to runs which are operational and preferably a single blank roller spacer extending across the width of the runs which are not operational. Product is then delivered to distribution headers which are connected to the runs containing the fluted metering sections and no product is delivered from those runs which are, in effect, blanked off. Along with the metering sections and blank sections, the meter roller assembly may comprise various spacers, bearings, etc.

It is also typically the case that some distribution headers feed more runs than others, so that the amount of metered product to the headers will be required to be varied. Spacers, ring blanks, and the like have been used for this purpose.

Various problems have arisen in the use of known meter rollers. Typical such problems involve severe torque and tolerance problems, corrosion caused by leakage of product through gaps between segments; pulsing delivery of product to the headers; difficulties in delivering a large seed or large particle product to the headers at the proper rate; and difficulties in delivering very fine products to the headers at the desirable rate.

It is desirable to provide an improved meter roller assembly to address the problems enumerated above and others.

Various approaches have been used in the past to attempt to provide segmented meter rollers; that is, meter rollers in which metering sections are divided as between fluted or active segments, and blank, or inactive segments.

One such prior method varies the amount of product delivered by each fluted metering roller by fixing a varying number of thin rings about the center line of the roller to simply reduce the volume of product to be delivered by the roller. This was intended to compensate for the differing numbers of active seed or fertilizer delivery tubes emanating from the distribution header fed by that particular metering roller.

Another method used to reduce flow from a given run comprises reducing the width of the fluted metering section and inserting separate spacers on each side of the metering section. This method results in a very large number of parts in the segmented meter roll assembly with consequent severe tolerance and torque problems.

Of interest are Canadian Patents 1,289,013; and 1,149,235 and Canadian published application Serial No. 2,242,115.

SUMMARY OF THE INVENTION

It has now been discovered that substantially all of the problem areas to which reference was made in the background discussion above can be alleviated to a significant extent by the use of segmented metering sections which are formed as a single unit or unitary section per run, which may have any desired combination of blank and fluted surfaces. The unitary sections may be formed by molding a single piece or by molding and joining two or more pieces, preferably with one piece corresponding to each segment. In a preferred embodiment, the outer ends of a section formed from joined pieces are machined to tolerance.

Thus, the invention provides a meter roller assembly for metered product delivery between a meter box and a series of product runs leading to a series of product distributors or distribution headers, the assembly comprising: a shaft for mounting for rotation in the box; and a series of roller sections mounted on the shaft, the roller sections chosen from the group consisting of blank sections or metering sections; and wherein the series of roller sections includes at least one unitary segmented metering section, each said segmented metering section secured to the shaft for rotation therewith and comprising at least one fluted segment and at least one blank segment.

In the preferred configuration, the segmented metering sections have a one piece or unitary construction. In a further embodiment the invention provides a unitary metering section for use in a meter roller assembly, the unitary metering section comprising at least one fluted segment and at least one blank segment. In yet another embodiment of the invention, the blank segments of the segmented sections have a harder surface than do the fluted segments.

BRIEF DESCRIPTION OF THE DRAWINGS

The advantages of this invention will be apparent upon consideration of the following detailed disclosure of the invention, especially when taken in conjunction with the accompanying drawings wherein:

FIG. 4 illustrates a front view of a meter roller in a meter box;

FIG. 5 is a perspective view of a segmented metering section illustrating offset flutes;

FIG. 6 is a perspective view of a segmented metering section illustrating discontinuous offset flutes or fingers; and FIG. 7 is a perspective view of a further embodiment of the invention.

DETAILED DESCRIPTION OF THE PREFERRED EMBODIMENTS

Figure 1:
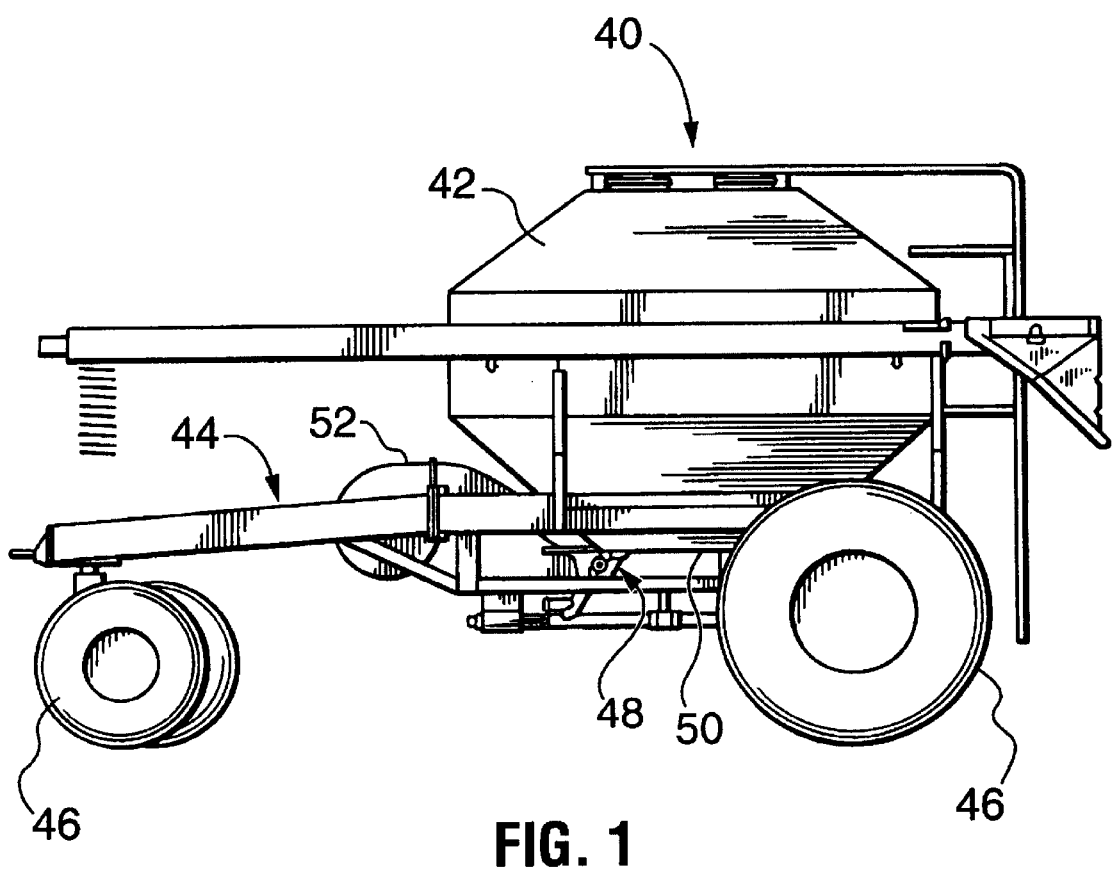
FIG. 1 illustrates an air cart of which the present invention may form a component.
Figure 2:
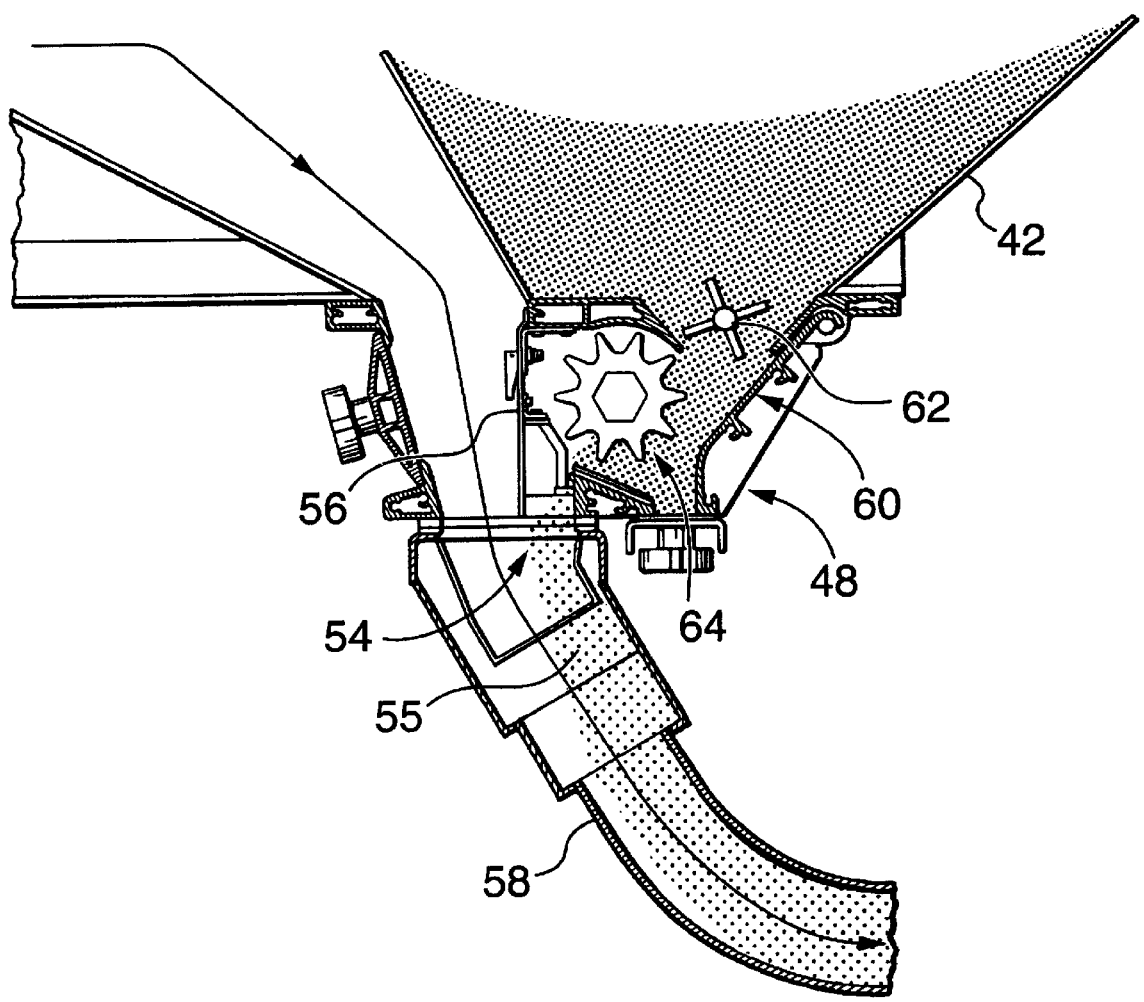
FIG. 2 is a cross-section through a part of the cart of FIG. 1 illustrating the general layout in the meter box.

Referring first to FIGS. 1 and 2, an air cart 40 incorporating the principles of the instant invention is shown. The air cart 40 is of a known general configuration and comprises a tank 42, or optionally a number of tanks (not illustrated), which may be mounted on a frame 44, which is in turn carried on wheels 46. A metering assembly 48 is mounted on the bottom 50 of tank 42. A blower 52 forces air past the outlet area 54 of the metering assembly 48 to carry product 55 from the metering assembly 48 to appropriate tubing runs to distribution headers on a soil working implement (headers and implement not shown). A series of dividers 56 at the meter assembly outlet 54 define a series of runs which direct product into a corresponding series of delivery tubes 58. In addition to dividers 56, the meter assembly 48 includes a meter box 60 within which are disposed agitators 62 and a meter roller assembly 64.

Figure 3:
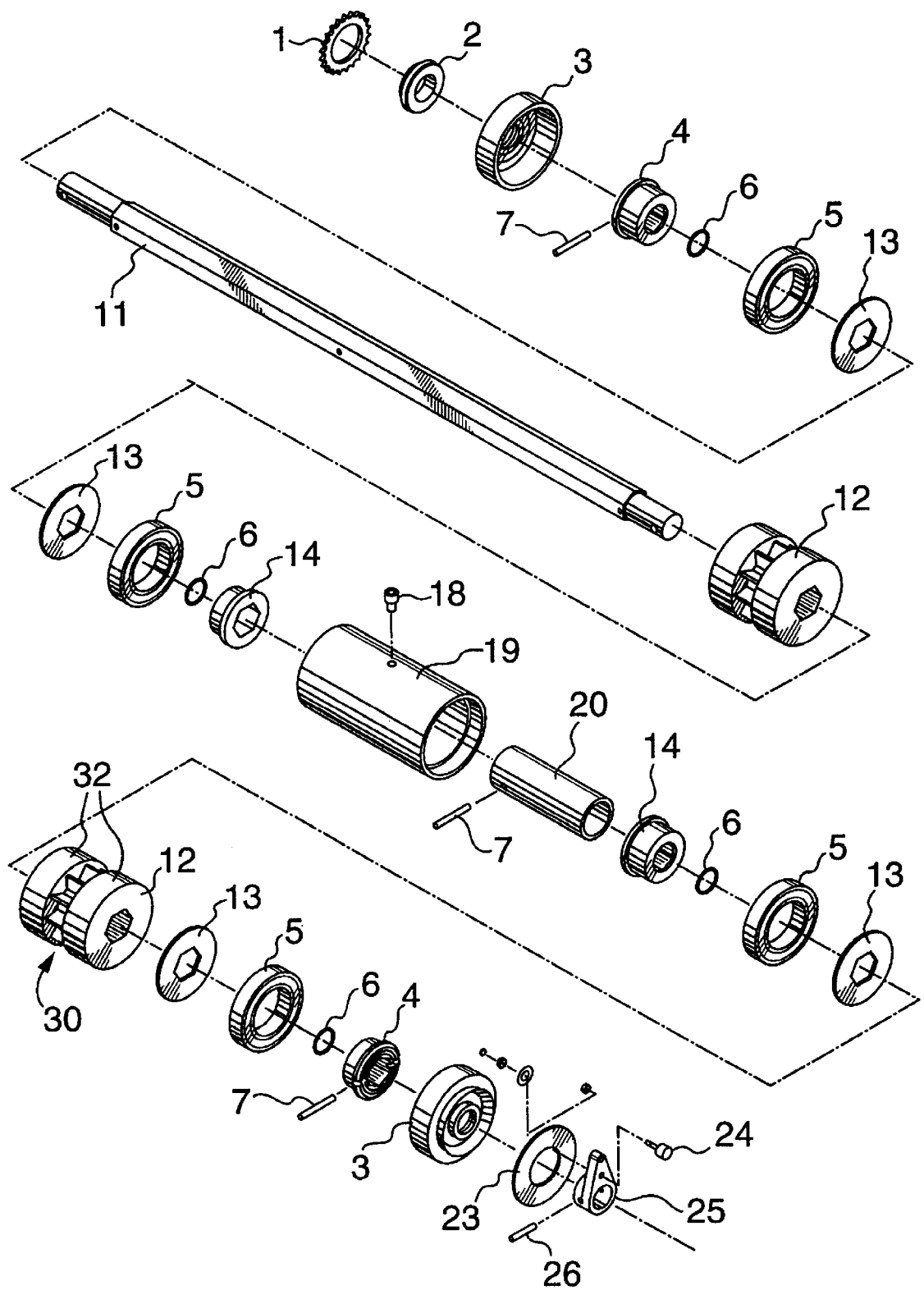
FIG. 3 is an exploded view of segmented metering sections and a meter roller assembly according to the invention.

With reference to the meter roller assembly illustrated in FIG. 3, a shaft 11, preferably of hexagonal configuration, is journalled for rotation in the metering box 60 of the air cart 40. A sprocket 1 is secured at one end of the shaft 11 to indicate shaft rotational speed. The shaft is preferably driven by a hydraulic motor, and certain implications of this drive mode will be defined below.

The meter roller assembly shown in FIG. 3 is intended for an air cart 40 having several runs, two of which include a segmented metering section 12. As will be understood by those skilled in the art, such assemblies may include additional runs, typically, for example, 8 runs. Any of those runs may contain a metering section or a blank section, depending on the number of distribution headers which are provided on the soil working implement in association with which the air cart 40 is used.

Depending on the configuration desired, each section may be blank, fully fluted across its width, or segmented as shown by metering sections 12. According to the principles of the instant invention, the roller assembly include at least one segmented section. A central blank section having an outer spacer 19 is illustrated to blank out unused runs. It is highly preferred that all unused runs be grouped centrally, so that a single extended blank section can be used across all unused runs. The central blank section comprises an outer spacer 19 and an inner spacer 20, the latter fixed by a pin 7 to the shaft 11 for centrally locating the spacer 20 on the shaft 11.

The bearing seats 14 abut against the inner spacer 20 and include a hexagonal bore, so that they rotate with the shaft 11. The bearing seats 14 abut a machined shoulder within the outer spacer 19. When the bearings 5 are seated on seats 14, the outer races of the bearings are in frictional engagement with the outer spacer 19, thus allowing the inner spacer 20 to rotate, while the outer spacer 19 is held against rotation by virtue of the cap screw 18 abutting against a part of the top of the meter box 60. The bearing shield 13 is then forced against the surface of the bearing seat 14 sealingly engaging the 0-ring 6 between the two. A bearing shield 13 is also in sealing engagement with the end of the central spacer assembly.

It should be noted that the central spacer assembly illustrated in FIG. 3 may be a special purpose arrangement which may serve functions unrelated to the metering per se as, for example, in pressure equalization.

The metering roller sections 12 abut against the bearing shields 13. Outer bearing seats 4 carry similar bearings 5 separated from the outer ends of the metering roller sections 12 by a second set of bearing shields 13. The outer bearing seats 4 are pinned by associated pins 7 to maintain the position of the sections between them. The outer bearings 5 journal the shaft 11. It is important to note that there would be no more bearings in the case of say, a 6 run assembly, in which case the intermediate sections or blank section would simply abut one another. In the absence of a central spacer assembly where all runs are in use, the shaft would carry only the two outer end bearings.

In this respect it is important to note that it is highly preferable that all of the sections be somewhat compressed together for sealing purposes. It is the outer seats 4 and their associated pins which maintain the compression across the roller assembly. The covers 3 are applied at the end of the metering section of the roll. A hub 2 is preferably fixed on the end of the shaft 11 and incorporates a speed sensor.

At the other end of the assembly there is preferably positioned an identification disk 23 to identify the metering roller type as, for example, between extra fine, fine, and coarse. A cam arrangement 24 and 25 is fixed to the end of the shaft 11 by a pin 26 and forms the driver for the agitator 62 (FIG. 2) to ensure smooth flow from the product tank into the meter box.

The segmented metering sections 12 preferably comprise a fluted segment 30 and two smooth blank segments 32. The combined width of the fluted segment and the two blank segments is essentially the same as the width of a single run.

While the positioning and the proportions of the segments may vary as desired, it is preferable that the metering sections comprise, as illustrated, a central fluted segment and two blank segments which are symmetric about the mid point of the roller.

Clearly, a run may have a preselected width, as in the case of existing machines, and the overall width of the metering section and of the fluted and blank segments of that roller can be varied to adapt an existing machine to the invention.

In a conventional assembly, wherein the metering roller is fluted across its entire width; that is, across the width of the run, and depending on the material to be delivered, the shaft will often be required to be operated at relatively low rpm, as, for example, typically down to about 2 rpm, in order to deliver correct amounts of product. At this lower rpm, there is a significant time during each rotation when no product is moved from the metering box into a run. This is because there is no flow when the end of a flute passes the run inlet. There is an interruption of flow as every flute passes. This has been found to result in a pulsing effect in the delivery of product to the distribution header and, consequently, in the uneven application of seed or fertilizer. By increasing the speed of rotation, the blank time during which a given flute is passing is reduced and the result is that a much more even flow of product to the distribution headers and hence into the soil can be achieved.

Clearly the increase in rotational speed, as measured by an increase in rpms, means that a larger quantity of product would be delivered to the distribution header by any given metering roller. The present arrangement avoids that problem by decreasing the capacity of the fluted segment of the metering roller. Thus, the shaft can be operated at higher rpm while delivering the same amount of product to the distribution header as would have been delivered under an older full width fluted metering section.

The arrangement offers the additional advantage that product can be readily handled which could not have been handled at low rpm rotational speed. For example, for large size low volume seed, such as corn, the metering rollers in the prior art could not be operated at a sufficiently low rpm to efficiently deliver proper amounts of product. At the higher rpm these types of product can readily be handled.

A further very significant advantage of the arrangement is that the hydraulic motors, which are the preferable drive means for the assembly, are very inefficient at low rotational speed. An increase of rpms from 2 to 4 or 6 rpm is highly significant in this regard. At those higher rpm values, the variable rate hydraulic drive will operate very efficiently. Furthermore, the equipment cost for the variable hydraulic motor to operate only at the higher rpms is significantly decreased.

Additional advantages can be obtained with variations in the construction of the segmented sections. In one preferred embodiment, the segmented sections are molded as a single unit. In another preferred embodiment, as illustrated in FIG. 7, the blank and fluted segments are again molded as a single unit, but with outer rings 91 installed as liners in that part of the mold defining the blank segments. The liners then become integral parts of the blank segments. In the preferred case the liners are harder than the rest of the material of the segmented section. This has the advantage that metered product is prevented from being pressed into the surface of the blank segments and potentially jamming between the blank segments and the box. The outer rings 91 can be adhered to the blank segments after molding, utilizing a suitable adhesive, to yield a one piece or unitary structure.

In a further preferred embodiment the blank and the fluted segments are molded separately, subsequently joined axially with a suitable adhesive to form the unitary section, and finally machined at the ends of the section to tolerance. The blank segments are molded from a harder material to thereby provide the advantage noted above.

In the preferred embodiments noted above, the preferred material is polyurethane. In that regard, typical hardness range for the harder part of the material is 75 to 80 shore D and for the fluted segment, 80 to 82 shore A.

Any suitable adhesive may be used for joining the parts where the segments are molded separately and then joined.

As a preferred alternative in the embodiment where liners are used in the mold, polycarbonate pipe bonds well to urethane during the molding process and so is preferred for that embodiment.

FIGS. 5 and 6 illustrate variations in fluted segment 30 of segmented section 12. In FIG. 5 fluted segment 30 comprises two integral rows of flutes 70 and 72 which can be seen to be out-of-phase relative to each other by one-half flute. This serves to reduce pulsing.

FIG. 6 illustrates discontinuous flutes 74 and 76, which are again out-of-phase relative to each other but which are also spaced axially from each other by reason of the discontinuity. Similar advantages are offered, particularly with larger diameter materials. In addition to reducing of pulsing, the proper placement of the discontinuous flutes serves to move metered product without the pinching or entrapment problems that have been encountered in prior art usage.

In the preferred configuration of this embodiment, the outer ends 78 of discontinuous flutes 74 and 76 abut against the inner sides 80 of blank segments 32. It has been found that pinching and jamming will almost inevitably result where large seed product is involved, if a gap is left between the flutes and the inner sides 80. In the most preferred embodiment, this metering section is a unitary structure with components molded together or held together by adhesive, or using a combination of molding and adhesive.

The central channel 82 between inner ends 84 and 86 of flutes 74 and 76 is preferably slightly wider than the largest dimension of the product to be metered. For example, for certain corn seed the width of the channel is preferably about ½". This will, in general, because of seed bunching over the flutes, allow seed to move through the metering segment without pinching, but will prevent seed from simply pouring unmetered through the segment.

In a preferred configuration of this embodiment, the extremities 88 of flutes 74 and 76 are recessed relative to surfaces 90 of blank segments 32.

Apart from the above operational advantages, there are significant improvements in life expectancy of the present assembly over prior art assemblies. Because there are significantly fewer components on the shaft, there is much less of a tolerance problem as between any two components. For example, in some prior art such assemblies, because there are a large number of components, the components must be manufactured with a shorter than ideal nominal size, in order to ensure that all components will be able to be fitted on the shaft. The result is potentially a somewhat sloppy and loose arrangement. This results in product working down through the gaps between components and resulting in corrosion problems, particularly in the bearings.

In the present case the components are substantially all urethane and are assembled on the shaft under overall compression, so that there are no gaps or much less chance of gaps developing. Hence corrosion problems are minimized.

In certain prior art such assemblies, where spacers or blanks are employed for various reasons, it is common to simply use a plastic blank with a circular bore which will fit over the shaft in a loose arrangement, such that the spacer does not rotate with the shaft. This frequently results in the bore in the blank becoming eccentric and this can contribute to the opening of gaps in the assembly, thus leading to the corrosion problem noted above. In the present case some of the blanks are integral with the metering rollers and others are separate blanks. For the separate blank section, the preferred construction comprises inner and outer shells. The outer shell is held against rotation but the inner shell rotates with the shaft, the two shells being separated by bearings.

Further, the use of multiple components which are in contact with, but not rotating with, the shaft results in severe torque problems.

In a typical air cart, there might be eight runs emanating from the meter box and thus up to eight metering sections. Typically a run is about 3 inches wide, so that the assembly would then be about 24 inches long. Typically a variety of metering sections are interchangeable on the shaft, the flutes of which are of varying degrees of fineness.

In the preferred case the tank is pressurized to essentially equalize pressure on both sides of the metering assembly. The pressurization may be at about 40 inches of water or 1½ psi.

The product is pneumatically driven through the runs and ultimately to the soil, and such air seeders are well known in the art.

The metering roller sections in the present case may have fluted segments which are varied in width depending on the type of metered product and the volume required. For example, a run may be feeding an 8 port header or a 12 port header, thus requiring a different product volume.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A meter roller assembly for an agricultural implement for metering product delivery between a meter box and a series of product runs leading to a series of product distributors, said meter roller assembly comprising:
   a shaft mounted for rotation in said meter box;
   a series of roller sections for mounting on said shaft, extending across said product runs, said roller sections chosen from the group consisting of blank sections or unitary metering sections;
   and wherein said series of roller sections includes at least one said unitary metering section corresponding to at least one said run, said at least one unitary metering section being mounted on said shaft for rotation therewith and having at least one fluted segment and at least one blank segment.

2. The assembly of claim 1 wherein said at least one unitary metering section includes a fluted segment symmetrical about the center of said section and a pair of blank segments symmetrical about outer ends of said fluted segment.

3. The assembly of claim 1 wherein said fluted segment of said at least one metering section comprises a series of flutes extending across said fluted segment.

4. The assembly of claim 1 wherein said fluted segment of said at least one metering section includes two sets of flutes symmetrical about a center of said at least one metering section, said flutes of each set being circumferentially spaced around said at least one metering section, the flutes of one set being out-of-phase with the flutes of the other set.

5. The assembly of claim 4 wherein said one set of flutes is out-of-phase by approximately one half of said flute spacing from said other set.

6. The assembly of claim 1 wherein said fluted segment of said at least one metering section comprises a series of flutes which are discontinuous about the center of said fluted segment.

7. The assembly of claim 6 wherein said discontinuous flutes on one side of said center are out-of-phase with said discontinuous flutes on the other side of said center.

8. The assembly of claim 1 wherein said series of roller sections includes at least one blank section.

9. The assembly of claim 8 wherein said at least one blank section comprises inner and outer shells separated by bearings, said inner shell being secured to said shaft for rotation therewith.

10. The assembly of claim 1 wherein said series of roller sections includes at least one metering section comprising a series of flutes extending fully across said metering section.

11. The assembly of claim 1 wherein said at least one metering section is comprised of an integral molded unit.

12. The assembly of claim 1 wherein said at least one metering section is comprised of an integral molded unit, an exterior cylindrical member being fixed to each said at least one blank segment of said molded unit.

13. The assembly of claim 12 wherein each said cylindrical member is harder than said molded unit.

14. The assembly of claim 13 wherein said molded unit is comprised of polyurethane and each said cylindrical member is polycarbonate.

15. The assembly of claim 1 wherein each said at least one blank segment and each said at least one fluted segment comprise separate parts which are joined axially to form each said at least one unitary metering section.

16. The assembly of claim 15 wherein said parts are joined axially by an adhesive.

17. The assembly of claim 15 wherein each said part comprising a blank segment is harder than each said part comprising a fluted segment.

18. The assembly of claim 17 wherein said parts are joined axially by an adhesive.

19. The assembly of claim 15 wherein outer ends of each said at least one unitary metering section are machined to tolerance.

20. A unitary metering section for use in a meter roller assembly of an agricultural implement for metering product delivery, said unitary metering section comprising at least one fluted segment and at least one blank segment.

21. The section of claim 20 wherein said at least one fluted segment is symmetrical about the center of said section and wherein said metering section includes a pair of said blank segments symmetrical about outer ends of said fluted segment.

22. The section of claim 20 wherein said fluted segment of said at least one metering section comprises a series of flutes extending across said fluted segment.

23. The section of claim 20 wherein said at least one fluted segment has two sets of flutes symmetrical about the center of said metering section, said flutes of each set being circumferentially spaced around said unitary metering section, the flutes of one set being out-of-phase with the flutes of the other set.

24. The section of claim 23 wherein said one set of flutes is out-of-phase by approximately one half of said flute spacing from said other set.

25. The section of claim 20 wherein said at least one fluted segment has a series of flutes which are discontinuous about the center of said fluted segment.

26. The section of claim 25 wherein said discontinuous flutes on one side of said center are out-of-phase with said discontinuous flutes on the other side of said center.

27. The section of claim 20 wherein said section is comprised of an integral molded unit, an exterior cylindrical member being fixed to each said at least one blank segment of said molded unit.

28. The section of claim 27 wherein each said cylindrical member is harder than said molded unit.

29. The section of claim 20 wherein each said at least one blank segment and each said at least one fluted segment comprise separate parts which are joined axially to form each said unitary metering section.

30. A method for constructing a unitary segmented metering section for a metering roller in which said segmented section comprises at least one fluted segment and at least one blank segment, said method comprising:
   molding each said fluted segment and each said blank segment as separate parts;
   joining said separate parts by applying adhesive to adjacent ends thereof; and
   machining the outer ends of the resulting unitary section to a predetermined tolerance.

31. A metering section for use in a meter roller assembly for metering product from a metering box, said metering section comprising:
   at least two blank segments;
   at least one fluted segment between said at least two blank segments;
   and wherein said fluted segment comprises two series of discontinuous flutes, each said series abutting at one end thereof against a respective side of said blank segment and extending from said respective sides less than half the distance across said fluted segment, whereby to leave an open channel around a center part of said fluted segment.

32. The section of claim 31 wherein the flutes of one said series are out of phase with the flutes of the other said series.

33. The section of claim 31 wherein said product has a largest dimension, the width of said open channel being greater than the largest dimension of said product.

34. In an agricultural implement having a frame; a storage tank mounted on said frame for carrying a supply of product; a product delivery system including a fan to create a flow of air through a series of product delivery tubes; a metering box connected to said storage tank and being cooperable with said product delivery tubes; and a metering roller rotatably mounted within said metering box to meter the flow of product through said metering box into said product delivery tubes, the improvement comprising:

said metering roller having at least one fluted segment and at least one blank segment.

35. The agricultural implement of claim 34 wherein said at least one fluted segment has two sets of flutes symmetrical about the center of said metering section, said flutes of each set being circumferentially spaced around said unitary metering section, the flutes of one set being out-of-phase with the flutes of the other set.

36. The agricultural implement of claim 35 wherein said one set of flutes is out-of-phase by approximately one half of said flute spacing from said other set.

37. The agricultural implement of claim 34 wherein said at least one fluted segment has a series of flutes which are discontinuous about the center of said fluted segment.

38. The agricultural implement of claim 37 wherein said discontinuous flutes on one side of said center are out-of-phase with said discontinuous flutes on the other side of said center.

39. The agricultural implement of claim 34 wherein said metering roller is formed of an integral molded unit including said at least one fluted segment and said at least one blank segment, an exterior cylindrical member being fixed to each said blank segment of said molded unit.

* * * * *